United States Patent [19]

Millard

[11] Patent Number: 4,488,615
[45] Date of Patent: Dec. 18, 1984

[54] RACK AND PINION STEERING GEAR AND VEHICLE FITTED WITH SAME

[75] Inventor: Barry J. Millard, Reading, England

[73] Assignee: Adwest Engineering Ltd., Reading, England

[21] Appl. No.: 422,857

[22] Filed: Sep. 24, 1982

[51] Int. Cl.³ .............................................. B62D 5/06
[52] U.S. Cl. .................................... 180/148; 180/154
[58] Field of Search ........................ 180/148, 151, 154

[56] References Cited

U.S. PATENT DOCUMENTS 4,172,507 10/1979 Millard ................................ 180/148

FOREIGN PATENT DOCUMENTS

| 659388 | 3/1963 | Canada | 180/148 |
| 2522215 | 12/1976 | Fed. Rep. of Germany | 180/148 |
| 1169391 | 11/1969 | United Kingdom | 180/148 |

*Primary Examiner*—David M. Mitchell
*Assistant Examiner*—D. Lynn Fugate
*Attorney, Agent, or Firm*—Bruns and Wall

[57] ABSTRACT

A single-ended power assisted rack and pinion steering gear comprising a housing defining a cylinder, double-acting piston means reciprocable within said cylinder, said piston means including a piston rod one end of which is connectable to a wheel lever of a steerable road wheel of a vehicle to impart steering thereto, a pinion connectable to the steering control of a vehicle, a toothed rack one end of which is pivotally connected to the other end of the piston rod and the other end of which is free, means resiliently urging the toothed rack into meshing engagement with the pinion, and valve means associated with the pinion for directing fluid under pressure to one side or the other of the double acting piston means. The invention also provides a vehicle fitted with such a rack and pinion steering gear, the vehicle having a driving position adjacent the front and one side thereof and the rack and pinion steering gear extending laterally of the vehicle and having said one end of the piston rod connected to a wheel lever associated with the steerable road wheel on the opposite side of the vehicle to the driving position.

2 Claims, 3 Drawing Figures

RACK AND PINION STEERING GEAR AND VEHICLE FITTED WITH SAME

BACKGROUND OF THE INVENTION

This invention relates to rack and pinion steering gear and to a vehicle fitted with same.

The use of power assisted rack and pinion steering gear is now well established in light vehicles such as motor cars and small commercial vans and trucks but has not yet been successfully used in heavy commercial vehicles such as large trucks or tractor units. The basic problem which has prevented the use of power assisted rack and pinion steering mechanisms in heavy commercial vehicles is the need for a small diameter pinion in order to obtain the required steering ratio, which conflicts with the need for sufficient strength and durability to withstand the heavy shock loads and power loads which are imposed on any steering gear used in a heavy commercial vehicle environment.

One proposal for overcoming the problems of using power assisted rack and pinion steering gear in heavy commercial vehicles comprised replacing the conventional track rod of the vehicle with a double ended power assisted rack and pinion steering mechanism wherein the rack had a piston rod pivotally connected to each of the opposite ends thereof and extending outwardly therefrom and wherein a tubular or solid reinforcing bar was provided which extended parallel with the rack and which was also pivotally connected at its ends to the piston rods, the said reinforcing bar serving to protect the rack and pinion from loads imposed on the steering gear and to provide a robust and substantially rigid structure extending between the wheel levers of the steerable road wheels of a vehicle. While this proposal overcame all of the problems previously encountered in trying to adapt power assisted rack and pinion steering gear for heavy commercial use, it was not commercially successful mainly due to the high cost thereof.

Another approach to the problem of providing satisfactory power assisted rack and pinion steering gear for heavy commercial vehicles has been to provide a single ended power assisted rack and pinion steering gear and to mount this between a conventional steering box and the wheel lever in place of the conventional drag link. In this arrangement the rack and pinion steering gear extends longitudinally fore-and-aft of the vehicle and has proved to be impractical both because of the length of the steering gear and because of the amount thereof which protrudes beyond the front of the vehicle or vehicles, such as large commercial trucks, wherein the driving position is at the very front of the vehicle.

SUMMARY OF THE INVENTION

It is therefore an object of the present invention to provide power assisted rack and pinion steering gear which is suitable for use in a heavy commercial vehicle, which is so designed that the pinion will not be directly exposed to shock or power loads, thus enabling the pinion to be of a desirably small diameter in order to obtain the required steering ratio, and which is adapted to be fitted in a vehicle in a novel manner such as to overcome the disadvantages inherent in the known proposals for providing power assisted rack and pinion steering gear for heavy commercial vehicles. The invention also has as its object to provide a vehicle when fitted with such a power assisted rack and pinion steering gear.

The present invention provides a single-ended power assisted rack and pinion steering gear comprising a housing defining a cylinder, double-acting piston reciprocable within said cylinder, said piston including a piston rod one end of which is connectable to a wheel lever of a steerable road wheel of a vehicle so as to impart steering thereto, a pinion connectable to the steering control of a vehicle, a toothed rack one end of which is pivotally connected to the other end of said piston rod and the other end of which is free. A biasing mechanism for resiliently urging the toothed rack into meshing engagement with the pinion, and a valve associated with said pinion for directing fluid under pressure to one side or the other of said double acting piston.

The invention also provides a vehicle having a front end and a rear end, a pair of steerable road wheels at the front end of the vehicle, a track rod connecting said steerable road wheels for steering movement together, a driving position adjacent the front and one side of the vehicle, and a single ended power assisted rack and pinion steering gear according to the present invention extending laterally of the vehicle, the pinion of the steering gear being connected to a manually operable steering control at said driving position and said one end of the piston rod of the steering gear being connected to a wheel lever associated with the steerable road wheel on the opposite side of the vehicle to said driving position.

BRIEF DESCRIPTION OF THE DRAWINGS

The invention will be more particularly described with reference to the accompanying drawings in which.

DESCRIPTION OF THE INVENTION

Figure 1:
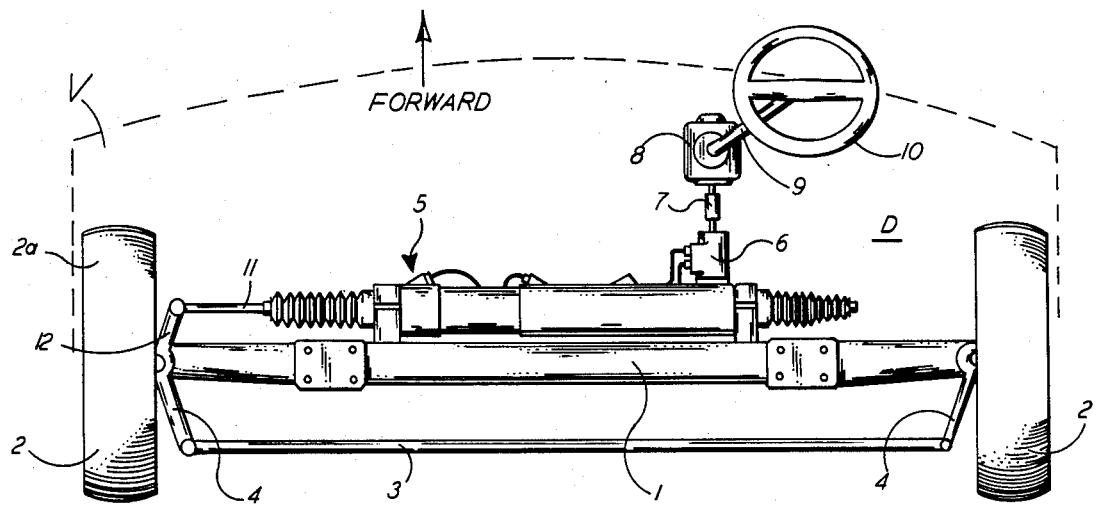
FIG. 1 is a diagrammatic plan view of the front axle and steering mechanism of a vehicle according to the present invention.

Referring now to FIG. 1 it will be seen that there is shown a front axle 1 having a steerable road wheel 2 mounted at each end thereof, the steerable road wheels 2 being connected for steering movement together by a conventional track rod 3 and track arms 4. Mounted on the axle 1 so as to extend parallel therewith is a single ended rack and pinion steering gear 5 which will be described in more detail hereinafter in connection with FIG. 3. The steering gear 5 has adjacent one end thereof a pinion (not shown in FIG. 1) which is connected by way of a rotary valve 6 and a shaft 7 to a conventional steering box 8, the steering box 8 being connected by way of a steering column 9 to a steering wheel 10 located at a driving position D which is adjacent the front and one side of the vehicle shown diagrammatically at V. At the other end thereof the steering gear 5 has extending from the housing thereof one end of a piston rod (not shown in FIG. 1) which is connected by way of a steering link 11 to a wheel lever 12 associated with the steerable road wheel 2a on that side of the vehicle opposite the driving position. It will be seen that in the embodiment of FIG. 1, which is particularly useful for heavy commercial vehicles such as trucks wherein the driving position is at the extreme front end of the vehicle and adjacent one side thereof, the steering gear 5 is mounted in front of the axle 1 while the track rod 3 is located behind the axle 1.

Figure 2:
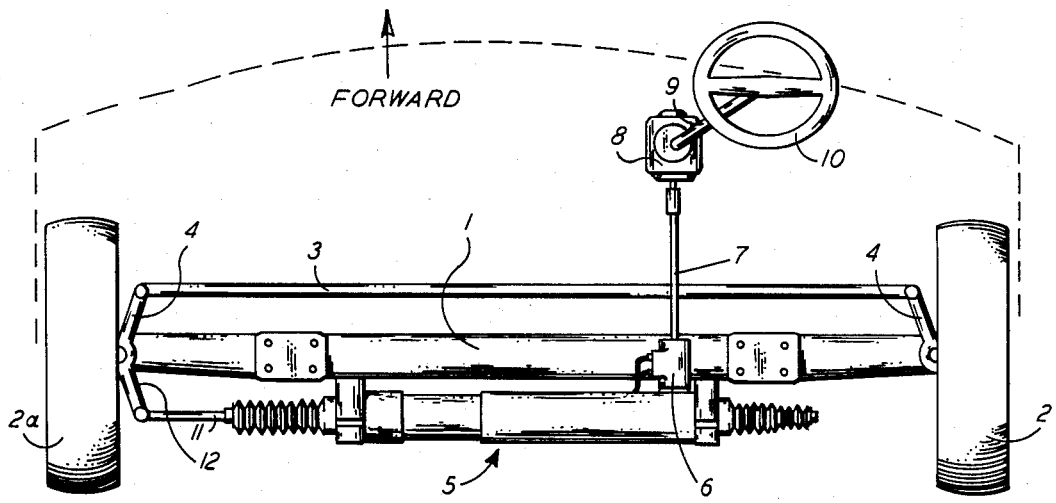
FIG. 2 is a diagrammatic plan view of the front axle and steering mechanism of another embodiment of a vehicle according to the present invention.

The embodiment of FIG. 2 is similar to that shown in FIG. 1 and like parts have been given like reference numerals. The only basic difference between the embodiment of FIG. 1 and the embodiment of FIG. 2 is that in the embodiment of FIG. 2 the steering gear 5 is arranged behind the axle 1, where it is less vulnerable to damage, while the track rod 3 is located in front of the axle 1.

Figure 3:
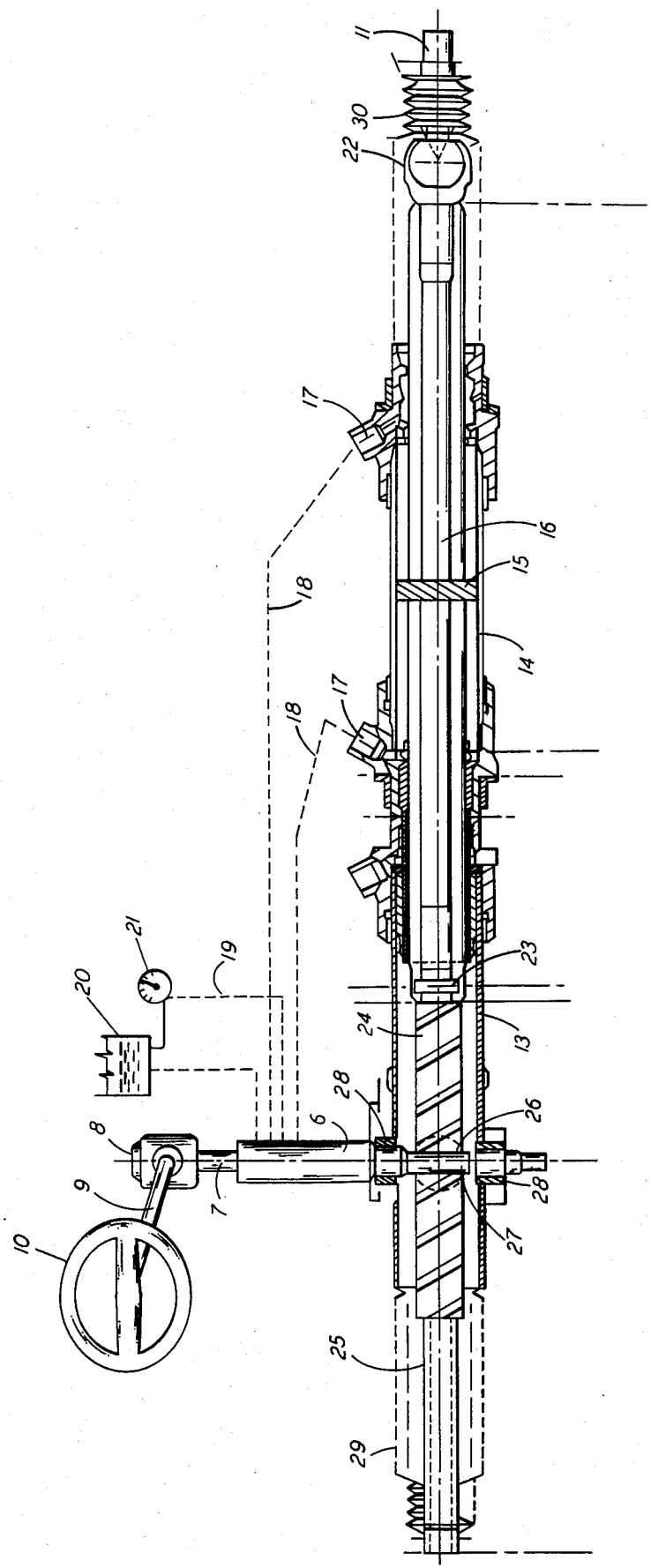
FIG. 3 is a sectional elevation of a single ended power assisted rack and pinion steering gear according to the present invention.

Turning now to FIG. 3 it will be seen that the single ended power assisted rack and pinion steering gear illustrated therein comprises an elongated housing 13 defining a cylinder 14 in which a double-acting piston 15 mounted on a piston rod 16 is reciprocable. The cylinder 14 has a pair of cylinder ports 17, one on either side of the piston 15, connectable by way of conduits diagrammatically shown at 18 to the rotary valve 6, the rotary valve 6 in turn being connected by way of suitable conduits 19 into a pressure fluid circuit comprising a reservoir 20 and an engine driven pump 21.

One end of the piston rod 16 extends from the housing 13 and is connected by way of a ball and socket joint 22 to the steering link 11. At its other end the piston rod 16 is pivotally connected by a pivot pin 23 to one end of a toothed rack 24 the other end 25 of which is left free. A biasing mechanism such as a resilient pad or spring indicated diagrammatically at 26 is provided for urging the toothed rack 24 into meshing engagement with a pinion 27. The axis of the pivot pin 23 is in a plane which is substantially parallel with a plane containing the axis of the pinion 27. The pinion 27 is mounted in bearings 28 in the housing 13. The pinion 27 is connected in conventional manner to the rotary valve 6 the input of which is connected by way of shaft 7, steering box 8 and steering column 9 to the steering wheel 10. Thus when the steering wheel 10 is turned in one direction or the other rotary motion will be imparted to the pinion 27 and this will in turn impart corresponding movement to the rack 24. At the same time the rotary valve 6 will be actuated and will direct fluid under pressure to one side or the other of the double-acting piston 15 to provide power assistance in transferring the steering movement imparted to the rack 24 by way of the piston rod 16 to the steerable road wheels 2. The free end 25 of the 24 rack and the protruding end of the piston rod 16 and the universal joint 22 are enclosed in bellows members 29 and 30 respectively which serve to prevent the ingress of dirt and foreign matter into the interior of the housing 13.

It will be readily understood by those skilled in the art that because the rack 24 is pivotally connected to the piston rod 16 and is resiliently urged about the pivot axis into meshing engagement with the pinion 27 and because the piston rod 16 and piston 15 thereon are interposed between the rack 24 and the output to the steering link 11, that the pinion 27 is not directly exposed to shock loading or power loading and is accordingly sufficiently well protected as to be able to be formed with a sufficiently small diameter as to enable the required steering ratio to be obtained.

While this invention has been described with reference to the structure disclosed herein, it is not confined to the details set forth and this application is intended to cover any modifications or changes as may come within the scope of the following claims.

I claim:

1. A vehicle having a front end and rear end that includes a pair of steerable road wheels mounted upon a front axle that extends laterally of the vehicle, a track rod mounted parallel with the axle to one side thereof for connecting the steerable wheels for movement together, a single ended power assisted rack and pinion steering gear comprising a housing cylinder that is mounted parallel with the axle on the side opposite the track rod, double acting piston means reciprocable within the cylinder that includes a piston rod, a pinion affixed to the steering column, a toothed rack in meshing engagement with the pinion, valve means also connected to the steering column for directing fluid under pressure from a source to one side or the other of the piston means, one end of said piston rod being connected to a wheel lever operatively associated with a steerable wheel and the opposite end of the piston rod being pivotably connected by a pivot means to one end of the toothed rack so that the rack and piston rod move together parallel to the axle, and the said other end of the rack being left free whereby the rack can move about the pivot means toward and away from the axis of the pinion, and biasing means for resiliently pivoting the rack about the pivot means into meshing engagement with the pinion.

2. A vehicle according to claim 1 wherein said one end of the piston rod is connected to one end of the wheel lever by means of a ball joint and a steering link, said lever being pivotably mounted at its center in the axle and connected at the other end to the track rod.

* * * * *